United States Patent
Langhammer

(10) Patent No.: US 6,317,771 B1
(45) Date of Patent: Nov. 13, 2001

(54) METHOD AND APPARATUS FOR PERFORMING DIGITAL DIVISION

(75) Inventor: Martin Langhammer, Maple (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 09/218,974

(22) Filed: Dec. 22, 1998

Related U.S. Application Data

(60) Provisional application No. 60/071,077, filed on Jan. 15, 1998.

(51) Int. Cl.[7] ..................................................... G06F 7/52
(52) U.S. Cl. .............................................................. 708/655
(58) Field of Search ...................................... 708/655, 653, 708/650

(56) References Cited

U.S. PATENT DOCUMENTS

| | | | |
|---|---|---|---|
| 5,027,309 | * | 6/1991 | Koumoto et al. ............... 708/655 |
| 5,493,523 | * | 2/1996 | Huffman ........................... 708/655 |

\* cited by examiner

Primary Examiner—Tan V. Mai
(74) Attorney, Agent, or Firm—Beyer Weaver & Thomas, LLP

(57) ABSTRACT

A method and apparatus for performing digital division in an integrated circuit is described. The inventive digital division is implemented by a combination of subtraction, logical OR, and shifting operations. The logical OR operation requires only approximately one gate per bit. The binary subtraction is only L bits wide at a Zth computation stage where Z equals L.

17 Claims, 6 Drawing Sheets

Stage (1)

```
000  | 1 | 010
001  | 1 |
vvv  | v | vv
  1  |⁰0 |
```

Quotient:     0XXX

Figure 3A

Stage (2)

```
00 | 10 | 10
00 | 11 |
vv | vv |
 0 |¹00 |
```

Quotient:     00XX

Figure 3B

Stage (3)

```
0 | 101 | 0
0 | 011 |
v | vvv |
1 |⁰010 |
```

Quotient:     0001

Figure 3C

Stage (4)

```
0100
0011
vvvv
 ⁰0
```

Quotient:     0011

Figure 3D

METHOD AND APPARATUS FOR PERFORMING DIGITAL DIVISION

CROSS REFERENCE TO RELATED APPLICATION

This application claims benefit of priority under 35 U.S.C. §119(e) of U.S. Provisional Application No. 60/071,077, filed Jan. 15, 1998, which is hereby incorporated by reference.

BACKGROUND OF THE INVENTION

1. Field of the Invention

The present invention relates generally to the field of digital division. More particularly, the present invention provides for faster and more efficient digital division in integrated circuits.

2. Description of the Related Art

Digital, or binary, division is a process whereby a binary number, referred to as a dividend is divided by a second binary number referred to as a divider. Digital division is increasingly required for many applications such as high quality graphics rendering. Unfortunately, division circuits are usually much larger than multiplier circuits for an equivalent data word length. One conventional method of performing digital division known as restoring and non-restoring division typically involves subtracting the divider from a reference number referred to as a current number. These methods of performing digital division generally require that the divider be added back to the current number after each computation stage. In the restoring method, the decision whether to add back the divider to the current number depends on the result of a subtraction stage. In the non-restoring method, a selection between addition and subtraction is made in the next computation stage following the subtraction stage. In either case, substantial amounts of logic and related logic circuitry are required to implement restoring and non-restoring division. Such additional logic typically can include at least an exclusive-OR (XOR) gate for every bit, which is the equivalent of five (5) NAND gates for every bit.

Hence, conventional techniques for implementing digital division require substantial amounts of logic resources and related logic circuitry. When the integrated circuit is a programmable logic device (PLD), large amounts of valuable programming resources are required to implement digital division, thereby limiting the size or precision of the data words that can be accommodated. Additionally, the serpentine data paths required to connect the related logic circuitry within a particular integrated circuit result in slow performance and can, in some cases, cause the integrated circuit to be non-functional.

In view of the foregoing, it would be advantageous and therefore desirable to provide an efficient method of performing digital division that can be implemented in an integrated circuit using fewer logical resources. By using fewer logical resources, the precision and the speed of the digital division as performed by the integrated circuit are able to be increased. Additionally, the probability of successfully implementing the digital division in an integrated circuit, such as PLD, is commensurably increased.

SUMMARY OF THE INVENTION

The present invention relates to an efficient method of performing digital, or binary, division in an integrated circuit. The invention provides for faster and more efficient digital division in integrated circuits. Efficient digital division is particularly advantageous for applications that require large amounts of division computations (e.g., graphics rendering). While the integrated circuit can be of many types, the present invention is well suited for a complex programmable logic device (CPLD) having various functional blocks included therein. Any number of functional blocks within the CPLD can be suitably coupled and programmed to perform the inventive digital division.

In one embodiment of the invention, a method for performing digital division is disclosed. A quotient data word is generated from a divider data word and a dividend data word. The divider data word and the dividend data word each include P bits where P is a precision index indicative of a desired precision of the digital division. The method can be performed by the following operations. Selected divider data word bits and selected current data word bits from a current number data word are operated on to form a subtraction result data word and an associated remainder result data word. A logical OR result data word based upon at least said associated remainder result data word is then generated. A quotient data word bit of the quotient data word is set to a predefined value based upon the logical OR result data word. A new current number data word is then generated based upon the logical OR result data word, the subtraction result data word, the current number data word, and the dividend data word. In a preferred embodiment, the operation that forms subtraction result data word and the associated remainder result data word is subtraction.

In another embodiment of the invention, a digital division circuit for generating a quotient data word from a divider data word and a dividend data word is disclosed. The divider data word and the dividend data word each include P bits where P is a precision index indicative of a desired precision of the digital division. The digital division circuit includes a first means for performing the function of operating on selected divider data word bits and selected current number data word bits from a current number data word to form a subtraction result data word and a associated remainder result data word. The digital division circuit also includes a second means connected to the first means for performing the function of generating a logical OR result data word based upon at least the associated remainder result data word. The digital division circuit further includes a third means connected to the second means for performing the function of setting a quotient data word bit of the quotient data word to a predefined value based upon the logical OR result. The digital division circuit also includes a fourth means connected to the third means for performing the function of generating a new current number data word based upon the logical OR result data word, the subtraction result data word, and the current number data word.

In a preferred embodiment, the digital division circuit is included in an integrated circuit that includes a programmable logic device.

In still another embodiment of the invention, a division circuit for generating a quotient data word from a divider data word and a dividend data word, the divider data word and the dividend data word each include P bits where P is a precision index indicative of a desired precision of the digital division is described. The division circuit includes a plurality of input/output lines arranged to receive the dividend data word and the divider data word and a subtractor connected to the input/output lines for subtracting selected divider data word bits from selected current number data word bits to form a subtraction result data word and an associated remainder result data word. The division circuit also includes a logical ORing unit connected to the subtractor for generating a logical OR result data word based upon at least the associated remainder result data word. The division circuit also includes a bit setter connected to the logical ORing unit for setting a quotient data word bit of the quotient data word to a pre-defined value based upon the logical OR result. The division circuit further includes a selector connected to the logical ORing unit and the input/output lines used to create a new current number data word based upon the subtraction result data word, the current number data word and selected dividend data bits.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings, wherein like reference numerals refer to analogous or similar elements to facilitate ease of understanding, and in which:

FIGS. 3a–3d illustrate the stage-wise operation corresponding to an exemplary division of a dividend N by a divider data word M in accordance with an embodiment of the invention;

DETAILED DESCRIPTION OF THE INVENTION

The present invention relates to an efficient method of performing digital, or binary, division in an integrated circuit. The invention provides for faster and more efficient digital division in integrated circuits. Efficient digital division is particularly advantageous for applications that require large amounts of division computations (e.g., graphics rendering).

Typically, the integrated circuit is a complex programmable logic device (CPLD) having various functional blocks included therein. Any number of functional blocks within the CPLD can be suitably coupled and programmed to perform the inventive digital division. By taking advantage of the re-programmable nature of the CPLD, the invention is capable of providing a configurable digital divider circuit as needed. This capability to re-configure as needed to perform digital division substantially increases the number of applications that require high speed, high precision digital division. One such application for which the invention is well suited is high speed, high quality graphic image rendering.

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

Figure 1:
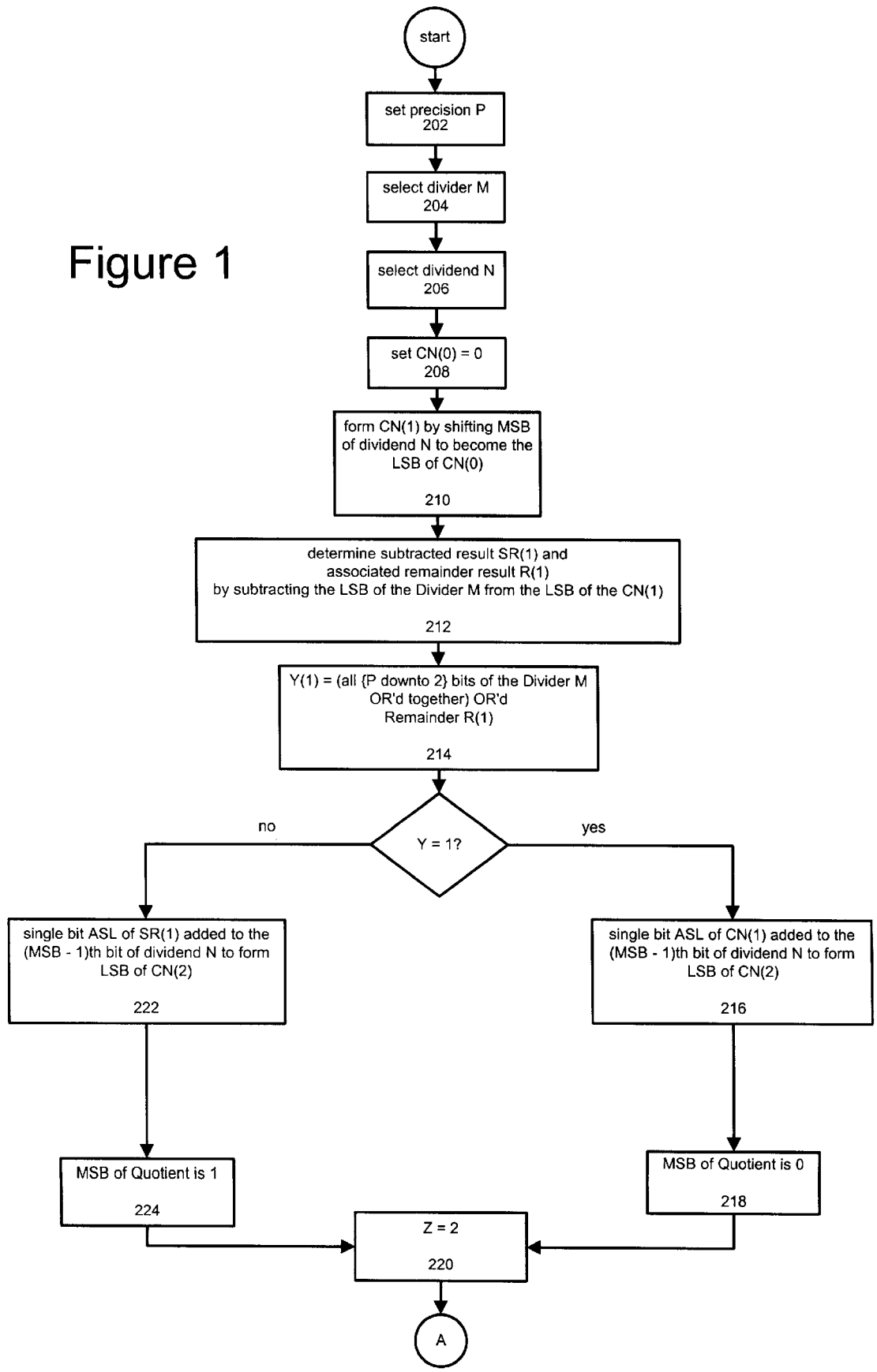
FIG. 1 is a flowchart describing a method of performing digital division of two binary numbers in accordance with an embodiment of the invention.

FIG. 1 is a flowchart 200 describing a method of performing digital division of two binary numbers in accordance with an embodiment of the invention. The method of performing digital division includes the following operations. First, the precision P of the binary numbers is selected (202). The precision P of the binary numbers refers to the number of bits used for each of the binary numbers involved in the inventive digital division. Next, a divider data word (M) is selected (204) where the divider data word M is an unsigned binary number having P bits. Next, a dividend data word N is selected (206) where the dividend data word N is an unsigned binary number also having P bits.

After the divider data word M and the dividend word N are selected, a binary number referred to as the current number CN having a precision Z at a stage Z is initialized to "0" (208) such that CN(0)=0. The current number CN(1), corresponding to the first stage is formed by shifting the Most Significant Bit (MSB) of the dividend word N so as to become the Least Significant Bit (LSB) of CN(1) (210). It should be noted that in another type of shift operation, referred to in the art as Arithmetic Shift Left (ASL), a data word is shifted at least one bit location to the left. In this way, a binary ($\times 2^k$),where k equals the number of bits shifted left, operation is equivalently performed. For example, if an ASL of a single bit (i.e., k=1) operates on a data word T represented by the string of binary digits $\{0\ 0\ 1\ 0\}_2$, or $2_{10}$, a resulting data word T' represented by the string of binary digits $\{0\ 1\ 0\ 0\}_2$, or $4_{10}$, is formed.

Next, a first computation stage Subtracted Result SR(1) and an associated first computation stage Remainder R(1) are formed by subtracting the LSB of the divider data word M from the LSB of the first computation stage current number CN(1) (212). Next, all of the {P down to 2} bits of the divider data word M are first logically OR'd together, the result of the first ORing operation is then logically OR'd with the first computation stage Remainder R(1) to form a first computation stage logical OR result value Y(1) (214).

If the first stage logical OR result value Y(1) equals 1, then a second computation stage number CN(2) is formed, by a single bit Arithmetic Shift Left (ASL) of the first computational number CN(1). The LSB of CN(2) is then formed by adding the $(MSB-1)^{th}$ bit of the dividend N to CN(2) (216). As the LSB of CN(2) after the ASL of CN(1) is always zero, this addition requires only a bit replacement. Next, the MSB of the Quotient data word Q is set to 0 (218) which completes the operations associated with the first computation stage. The computation stage index Z is then set to 2 (220).

If the first stage logical OR result value Y(1) equals 0, then a second computation stage number CN(2) is formed, by a single bit Arithmetic Shift Left (ASL) of the first stage subtractive number SR(1). The LSB of CN(2) is then formed by adding the $(MSB-1)^{th}$ bit of the dividend to CN(2) (222). As the LSB of CN(2) after the ASL of CN(1) is always zero, this addition requires only a bit replacement. Next, the MSB of the Quotient data word Q is set to 1 (224) that completes the operations associated with the first computation stage. The computation stage index Z is then set to 2 (220).

Figure 2:
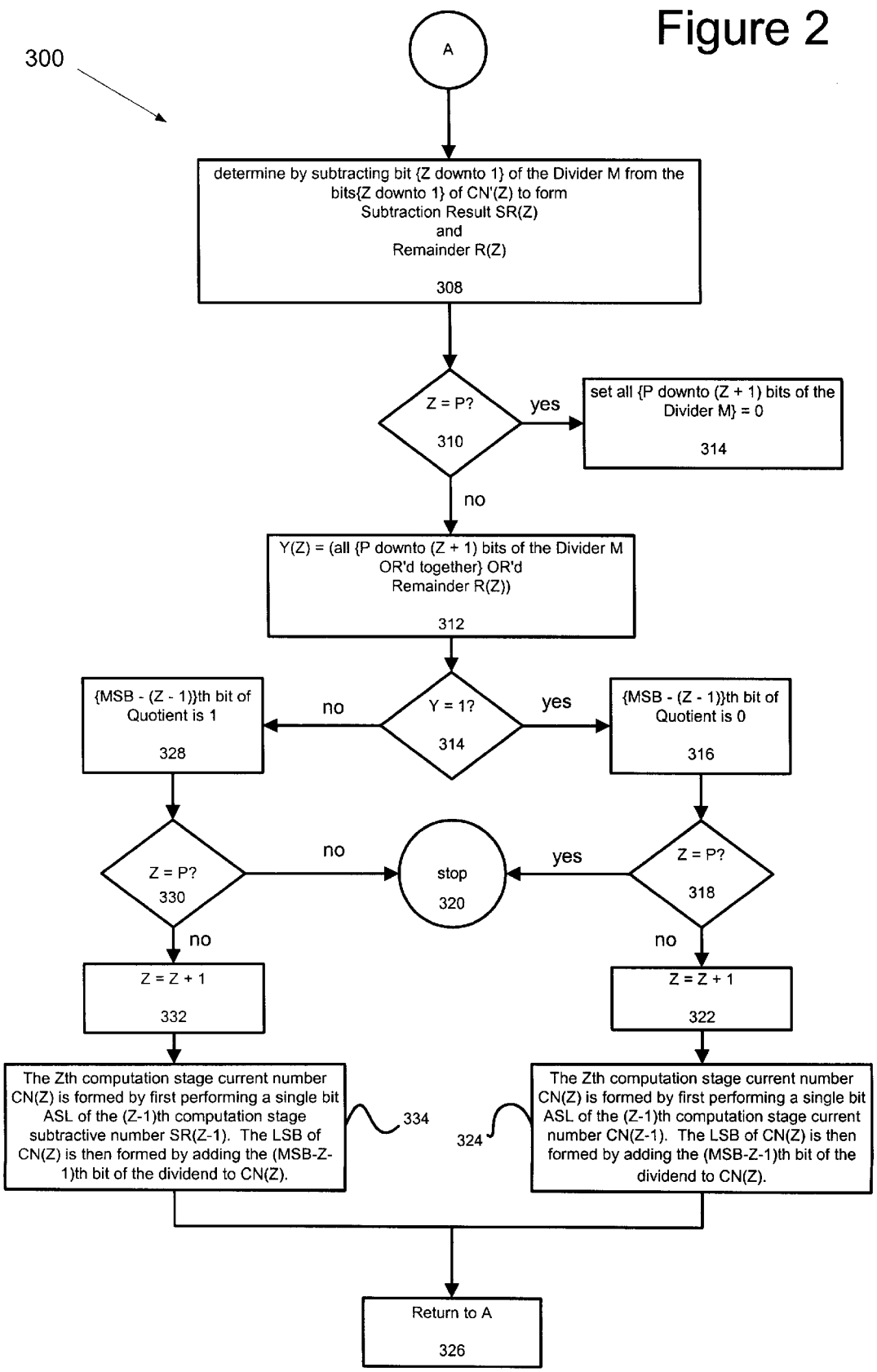
FIG. 2 is a flowchart describing additional computation stages required to perform the digital division of FIG. 1.

FIG. 2 is a flowchart 300 describing subsequent computation stages required to complete the digital division initiated in FIG. 1. It should be noted for sake of clarity only, all remaining computation stages and associated operations are described with respect to the computation stage index Z. In the described embodiment, the computation stage index Z is incremented by 1 only after completion of all operations associated with the Zth computation stage.

Next, the {Z down to 1} bits of the divider data word M are subtracted from the {Z down to 1} bits of a Zth computation stage intermediate current number CN'(Z) to form a Zth computation stage Subtraction Result SR(Z) and a Zth computation stage Remainder R(Z) (308).

In the case where the computation stage index Z does not equal the precision index P (310), all of the {P down to (Z+1)} bits of the divider data word M are logically OR'd together. The result of the logical ORing of all of the {P down to (Z+1)} bits of the divider data word M is logically OR'd with the Zth computation stage Remainder R(Z) to form a Zth computation stage logical OR result Y(Z) (312).

However, in the case where the computation stage index Z equals the precision index P (310), all of the {P down to Z+1)} bits of the divider data word M are set identically to logical "0" (314). This logical "0" result then replaces the "logical ORing of all of the {P down to (Z+1)} bits of the divider data word M" operation of block 312. In this way, the Zth computation stage logical OR result Y(Z) is formed by the logical operation of ORing logical "0" with the Zth computation stage logical Remainder R(Z) (312).

If the Zth computation stage logical OR result Y(Z) equals logical "1" (314), then the {MSB −(Z−1)}$^{th}$ bit of the quotient data word Q is set to a logical "0" (316). If the associated computation stage index Z equals the precision index P (318), then the inventive digital division is complete (320). If, however, computation stage index Z does not equal the precision index P(318), then the computation stage index Z is incremented by 1 such that Z=Z+1 (322). The Zth computation stage current number CN(Z) is formed by first performing a single bit ASL of the (Z−1)$^{th}$ computation stage current number CN(Z−1). The LSB of CN(Z) is then formed by adding the (MSB−Z−1)$^{th}$ bit of the dividend to CN(Z) (324). As the LSB of CN(Z) after the ASL of CN(Z−1) is always zero, this addition requires only a bit replacement. The digital division operation is then directed back to 308 (326). However, in the case where the Zth computation stage logical OR result Y(Z) does not equal 1 (314), the {MSB−(Z−1)}$^{th}$ bit of the quotient data word Q is set to logical "1" (328). As above, if computation stage index Z equals the precision index P (330), then the inventive digital division is complete (320). If, however, the computation stage index Z does not equal the precision index P (330), then the computation stage index Z is incremented by 1 such that Z=Z+1 (332). The Zth computation stage current number CN(Z) is formed by first performing a single bit ASL of the (Z−1)$^{th}$ computation stage subtractive number SR(Z−1). The LSB of CN(Z) is then formed by adding the (MSB−Z−1)$^{th}$ bit of the dividend to CN(Z). As the LSB of CN(Z) after the ASL of CN(Z−1) is always zero, this addition requires only a bit replacement. The digital division operation is then directed back to 308 (326).

FIGS. 3a–3d illustrate the stage-wise operation corresponding to an exemplary division of dividend data word N $(1010)_2=10_{10}$ by divider data word M $(0011)_2=3_{10}$ in accordance with an embodiment of the invention. A quotient data word Q and an associated remainder R corresponding to the division of dividend N $(1010)_2=10_{10}$ by divider data word M $(0011)_2=3_{10}$ are derived thereby.

FIG. 3a illustrates the result of an exemplary digital division first computation stage computation in accordance with an embodiment of the invention. It should be noted that with precision index P=4, the divider data word M{0 0 1 1}$_2$, the dividend data word N{1 0 1 0}$_2$, and the Quotient data word Q will all be 4 bits in length commensurate with the precision of 4 bits. The first computation stage current number CN(1)={0 0 0 1}$_2$ is formed by first shifting the MSB of dividend data word N{1 0 1 0}$_2$ to the LSB position of CN (0)={0 0 0 0}$_2$. The LSB of the divider data word M{0 0 1 1}$_2$ is then subtracted from the LSB of CN(1)={0 0 0 1}$_2$ to form the first computation stage subtracted result SR(1)= {0} with the first computation stage remainder R(1)={0}. Next, a first computational stage logical OR result Y(1) is formed by first ORing all the {4 down to 2} bits of the divider data word M{0 0 1 1} together. In this case, the ORing operation logically OR's {0+0 +1}, where + denotes a logical OR operation. That OR result (i.e., a logical "1") is then logically OR'd with the first computation stage subtracted result R(1)={0} resulting in a the first computation stage logical OR result Y(1)={1}. Since the first computation stage logical OR result Y(1)={1}, the MSB of the Quotient data word Q is set to 0 such Quotient data word Q at the first computation stage is Q={0 X X X}. It should be noted that "X" refers to bits as yet undetermined.

FIG. 3b illustrates an exemplary digital division second computation stage computation in accordance with an embodiment of the invention. Since the first computation stage logical OR result Y(1)={1}, the second computation stage current number CN(2) is formed by first performing a single bit ASL of the first computation stage current number CN(1) after which the MSB of the shifting result is discarded. The second computation stage current number CN(2) is then formed by adding the shifting and discarding result to the {MSB−1}$^{th}$ bit of the dividend data word N {1 0 1 0}$_2$ such that the second computation stage current number CN(2)={0 0 1 0}. Here, it should be noted that the adding to obtain the second computation stage current number CN(Z)={0010} can also be obtained by shifting the {MSB−1}$^{th}$ bit into the shifting and discarding result during or after the shifting.

Next the {2 down to 1}$^{th}$ bits of the divider data word M {0 0 1 1} are then subtracted from the {2 down to 1} bits of the CN (2)'={0 0 1 0} to form the second computation stage subtracted result SR(2)={0 0} and the second computation stage remainder R{2}={1}. Since the precision index is 4 and does not equal the computation stage index which is 2, a second computation stage computational logical OR result Y(2) is formed by first ORing all the {4 down to 3}bits of the divider data word M {0 0 1 1} together. That OR result (i.e., a logical "0") is then logically OR'd with the second computation stage subtracted result R(2)={1} resulting in the second computation stage logical OR result Y(2)={1}. Since the second computation stage computational logical OR result Y(2)={1}, the (MSB−1)$^{th}$ bit of the of the Quotient data word Q is set to 0 such that the second computational stage Quotient data word Q is {0 0 X X}.

FIG. 3c illustrates an exemplary third stage digital division computation in accordance with an embodiment of the invention. Following the same operational procedures as illustrated in FIG. 2, a third computational stage Subtracted Result SR(3)={0 1 0} and a third computational stage Remainder R(3)=0 along with a third computational stage logical OR result Y(3)=0 are formed. In this case, the third computational stage Quotient data word Q is {0 0 1 X}.

FIG. 3d illustrates an exemplary fourth stage digital division computation in accordance with an embodiment of the invention. It should be noted that in the fourth computational stage, the computation stage index Z (=4) equals the precision index P (=4) indicating that the fourth computational stage is in fact the final computation stage in the inventive digital division. Again following FIG. 2, a fourth computational stage Subtracted Result SR(4)={0001} associated with a fourth computational stage Remainder R(4)=0 are formed. In this case, since the computational stage index Z equals the precision index P, the fourth computational logical OR result Y(4)=0. Since the fourth computational logical OR result Y(4)=0, the fourth (and final) computational stage Quotient data word Q is $\{0\ 1\ 1\}_2$, or $3_{10}$.

Figure 4:
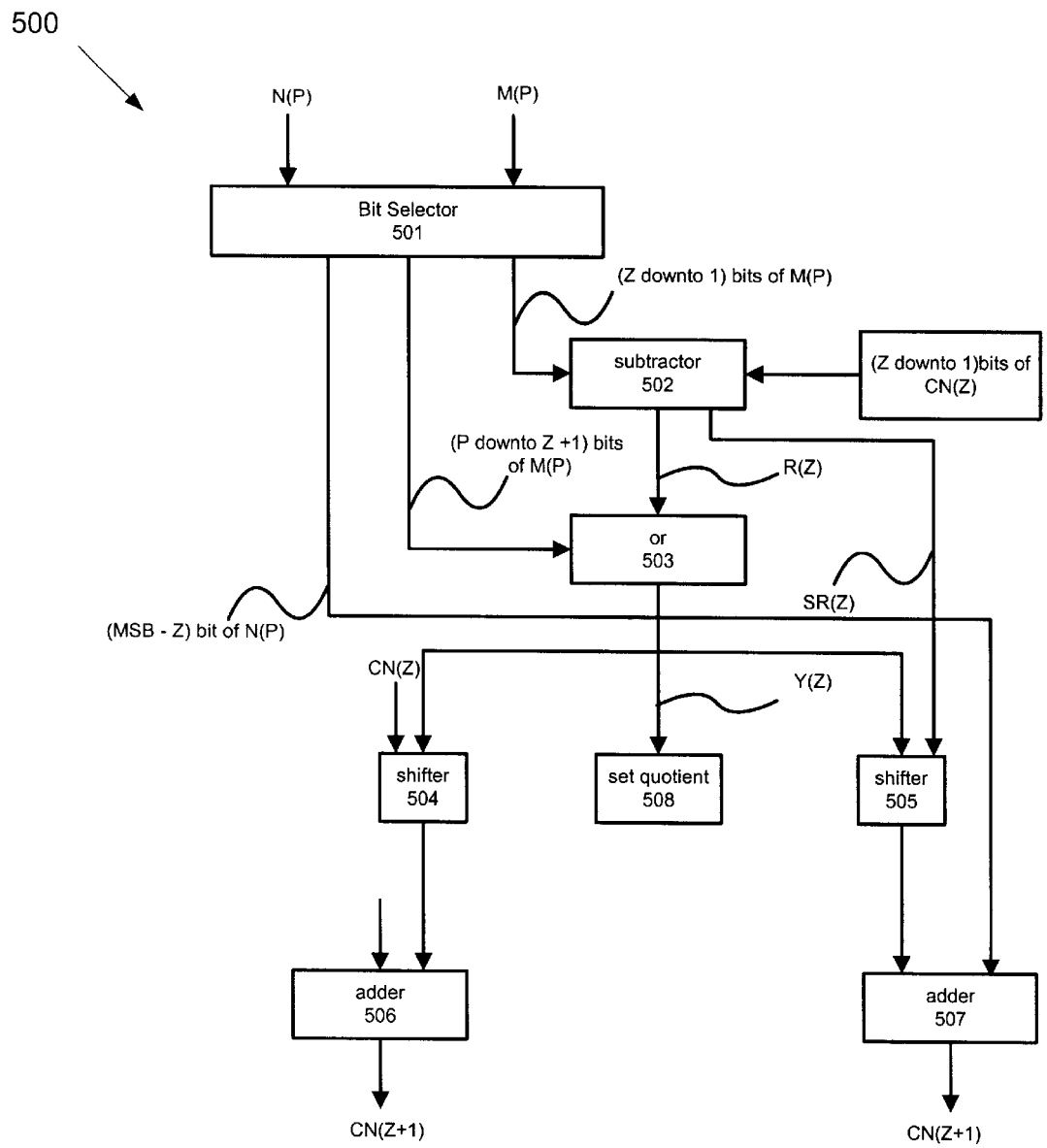
FIG. 4 is a block diagram illustrating an implementation of a digital divider circuit in accordance with an embodiment of the invention.

FIG. 4 is a block diagram illustrating a general implementation of a digital divider circuit 500 in accordance with an embodiment of the invention. The divider circuit in FIG. 4 represents all computation stages, where stage index Z is less than precision index P. The digital divider circuit 500 includes a bit selector 501. In a preferred embodiment, the bit selector 501 does not require any logic resources and it consists of entirely wire resources.

The nomenclature of the described implementation of the digital divider circuit 500, the symbols M {P} and N {P} indicate that the divider word M and the dividend word N are of a precision P implicating that each data word includes P bits.

During operation, the bit selector 501 selects a predetermined group of bits from the datawords stored therein. In various embodiments of the invention, the bit selector 501 may include data buffers and/or memory cells, to increase the overall throughput of the divider. This is known in the art as pipelining. The memory cells may or may not be present at every computation stage of the design. In the case where data buffers or memory cells are present in a computation stage, the number of data buffers or memory cells for the divider, M{P}, are P, where P is the number of bits of precision in the divider; the number of data buffers or memory cells for the portion of the dividend are Z, where Z is the computation stage of the division algorithm. Where pipelining is implemented for the divider M{P}, and the portion of the dividend N{P}, it must also be implemented for the current number CN(Z) the number of data buffers, or memory cells for CN(Z) is Z, where Z represents the computation stage of the divider.

First, the precision P of the digital division is selected such that the divider word M{P} at stage Z includes P data bits, and the dividend word N{P} at stage Z includes (P–Z) data bits. The divider word M{P} and the dividend word N{P} are then received at the bit selector unit 501.

The bit selector 501 sends the (Z downto 1) of M{P} bits to a subtractor 502, which also receives the (Z downto 1) bits of CN(Z), from either the calculations performed in the previous $(Z-1)^{th}$ and Zth stages. The subtractor 502 performs a binary subtraction on the received data words, with CN(Z) being the subtractend, and the (Z downto 1) bits of M {P} being the subtrahend. The subtractor outputs both a Zth computation stage subtraction result SR(Z) as well as a Zth computation stage remainder R(Z).

The subtractor 502 outputs the Zth computation stage remainder R(Z) to a logical OR unit 503. The logical OR unit 503 also receives data signals from bit selector 501, namely the (P downto Z+1) bits of the divider M{P}. The logical OR unit then performs a total of (P–Z) logical OR operations on the incoming data.

The logical OR unit 503 sends the Zth computation stage logical OR result Y(Z) to a set quotient block 508. The set quotient block will set the $\{P-Z+1\}^{th}$ bit of the quotient depending on the value of Y(Z).

Figure 5:
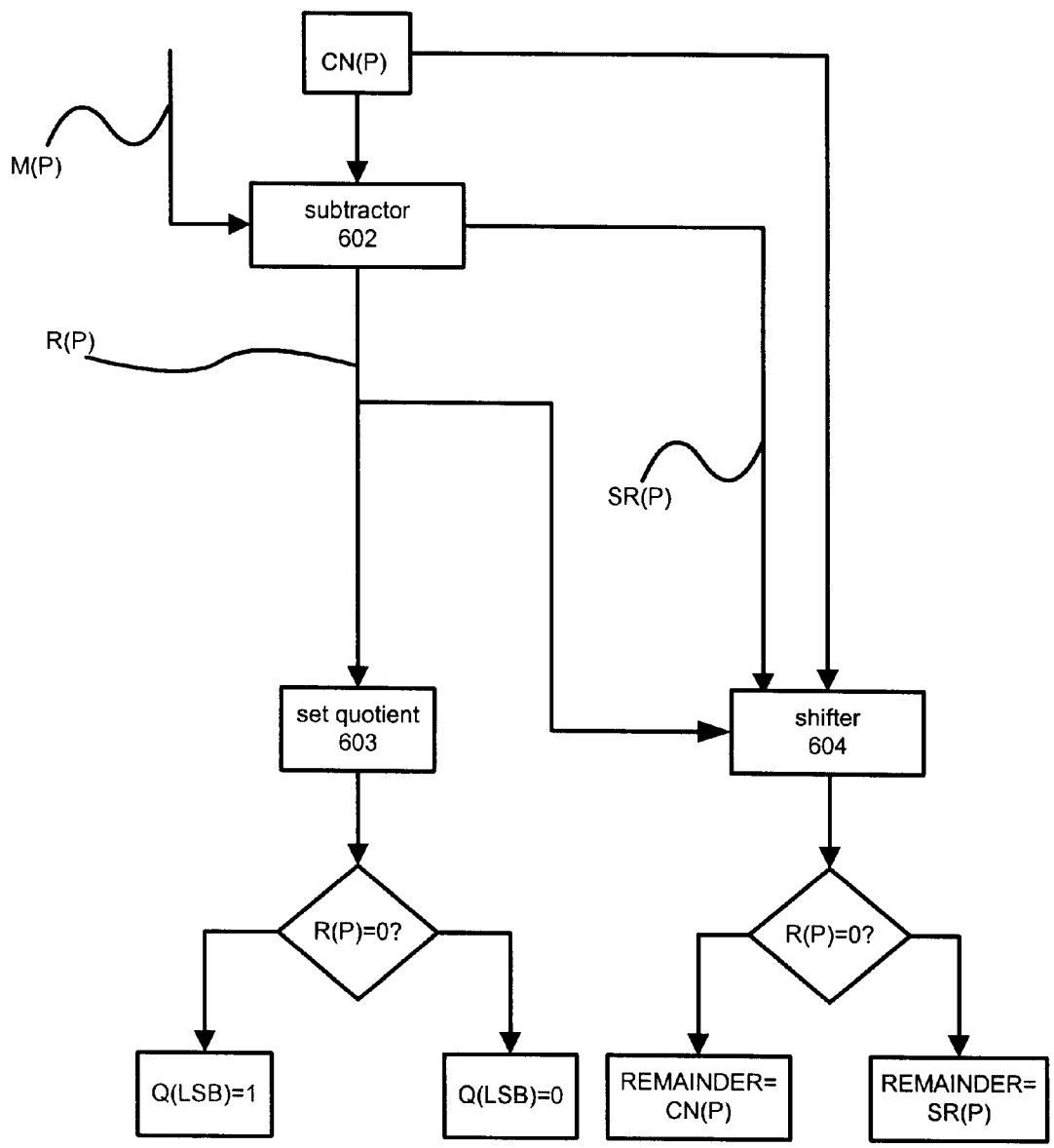
FIG. 5 is a block diagram of a digital divider circuit as shown in FIG. 4 configured for a final computation stage.
Figure 6:
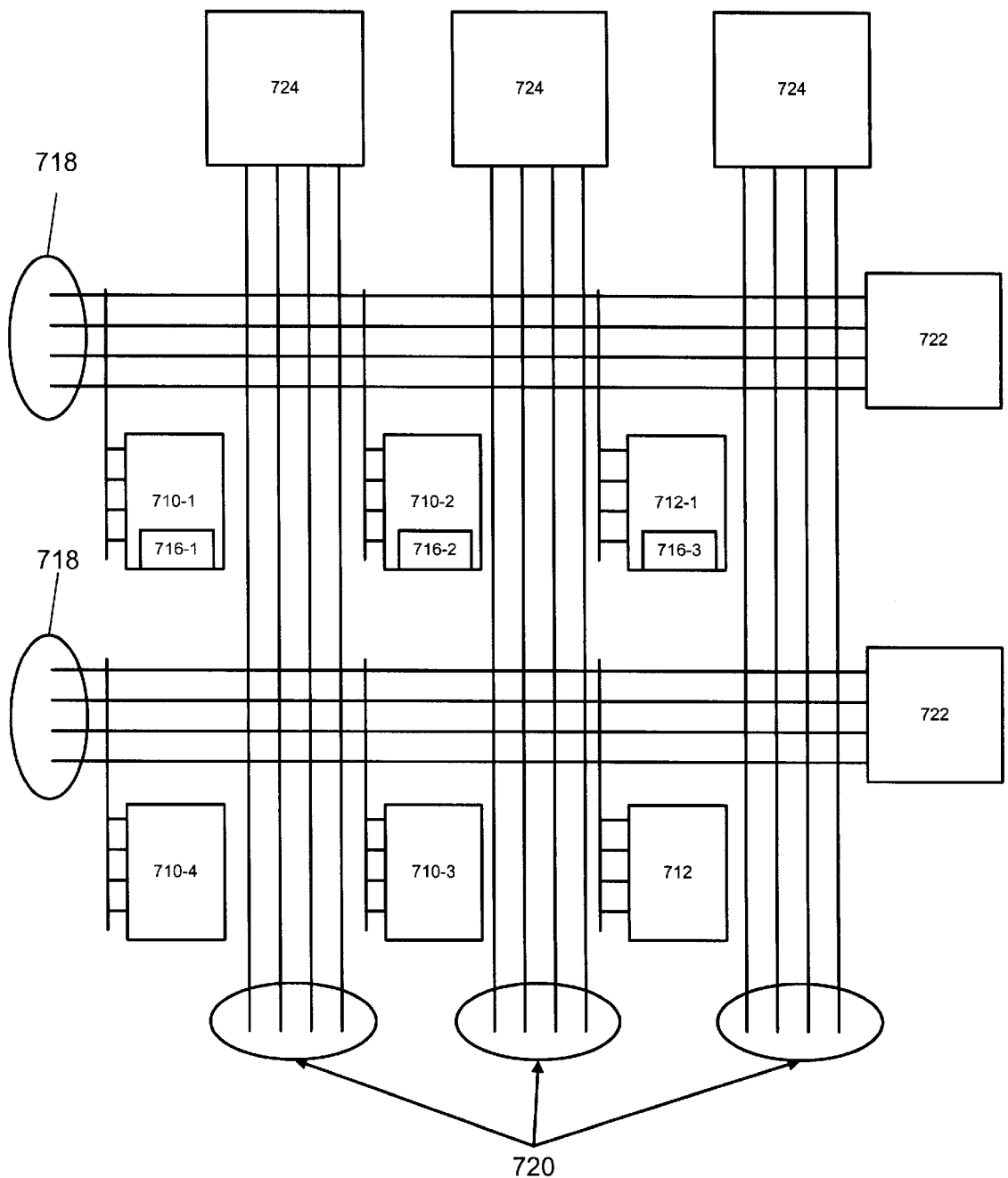
FIG. 6 is an illustration of a CPLD having an embedded array programmable logic design useful in implementing digital divider circuits in accordance with an embodiment of the invention.

Depending on the value of the Zth computation stage logical OR result Y(Z), a Zth computation stage current number CN(Z) is formed. In the case where the Zth computation stage logical OR result is a logical "0", a shifter unit 505 shifts the data word SR(Z), and passes the result to an adder unit 507, where the shifted data word is added to the $(MSB-Z)^{th}$ bit of the dividend N{P} from bit selector 501. Alternatively, in the case where the Zth computation stage logical OR result Y(Z) is a logical "1", a shifter unit 504 shifts the current number CN(Z) for the Zth stage, and passes the data word to adder unit 506. Adder unit 506 adds the shifted data word CN(Z) to the $(MSB-Z)^{th}$ bit of the dividend N{P} from bit selector 501. The digital divider circuit 500 performs the inventive digital division of the divider word M and the dividend word N for any arbitrary computation stage index Z that does not equal the precision index P as follows FIG. 5 is a block diagram of a digital divider circuit 600, as shown in FIG. 4, but configured for the final stage. It should be noted that digital divider circuit 600 is representative of the digital divider circuit 500 when computation stage index Z equals the precision index P. A subtractor unit 602 receives the current number CN(P) from the computation stage CN(P–1), and all P bits of the divider data word M{P}. The subtractor unit 602 then subtracts the divider word M{P} from the current number CN(P), to form a Pth computation stage remainder R(P), and a Pth computation stage subtracted number SR(P).

The Pth computation stage remainder, R(P) is forwarded to a set quotient unit 603, which sets the LSB of the quotient. If R(P) is logical "0", the LSB of the quotient is set to logical "1". If R(P) is logical "1", the LSB of the quotient is set to logical "0".

A selector unit 604 receives data words, including the Pth computation stage remainder R(P), the Pth computation stage subtracted number SR(P), and the Pth computation stage current number, CN(P). The remainder of the division operation is then determined. If the remainder R(P) is logical "0", the remainder of the division operation is the current number CN(P). If the remainder R(P) is logical "1", the remainder of the division operation is the subtracted number SR(P).

The inventive digital division operation is then complete.

FIG. 7 is an illustration of a CPLD 700 having an embedded array programmable logic design useful in implementing digital divider circuits in accordance with an embodiment of the invention. Although only a few logic array blocks or memory blocks are illustrated, it should be appreciated that any number may be provided in order to meet the needs of a particular system.

The CPLD 700 includes logic array blocks (LAB) 710 and embedded array blocks (EAB) 712. The EAB 712 includes a memory array 714 suitable for storing data while the LAB 710 includes logic elements 716 suitable for performing simple logic functions.

The LABs 710 and the EABs 712 are programmably interconnected by way of a plurality global horizontal conductors 718 and a plurality of global vertical conductors 720 to form a logic and memory array. The global horizontal conductors 718 couple to horizontal ports 722, and the global vertical conductors 720 couple to vertical ports 724.

The EAB is a flexible block of random access memory (RAM) with registers on the input and output ports. As is known in the art, a RAM is an array of individual memory cells, of which each cell includes a plurality of transistors configured to store digital data in the form of a single bit. Typically, the individual memory cells are arranged to form data words of varying length depending upon the particular application. In practice, data words may be of any length, however, data word lengths of 1, 8, 16, or 32 bits are common but any word length desired by the user is possible. As structured, the RAM device has the ability to access, or read, each stored data bit or data word independently of any other stored data bit or word by selectively enabling desired rows and columns.

A digital divider circuit in accordance with an embodiment of the invention can be implemented, otherwise referred to as fitted, by the CPLD 700 by first selectively programming appropriate ones of the LABs 710 and EABs 712. The programmed LABs 710 and EABs 712 are in turn appropriately programmably connected to form the inventive digital divider circuit 500 as illustrated in FIG. 4. For example, the logic elements 716-1 included in the LAB 710-1 can be programmed to function as a bit selector unit such as the bit selector units 502 and 504 included in the digital divider circuit 500 shown in FIG. 4. The logic elements 716-2 included in the LAB 710-2 can be configured to operate as a bit shifter unit much the same as the bit shifter unit 508 shown in FIG. 4.

Additionally, the logic elements 716-2 included in the LAB 710-2, for example, can also be configured to function as a bit selector unit much as the bit selector unit 510 as well as a subtractor unit much as the subtractor unit 512 included in the digital divider circuit 500 shown in FIG. 4. In this way, the performance of the digital divider unit is substantially enhanced since the data paths (and associated signal delays) over which the various signals are sent are substantially reduced. In the described implementation, the LAB 710-3 can be configured to function as a logical OR unit (much as the logical OR unit 514) while the LAB 710-4 can be configured to operate as an incrementer unit (much as the incrementer unit 518).

Data storage buffers such as the data buffer unit 506 shown in FIG. 4 suitable for appropriately storing data words such as a current number CN data word can be formed by any of the EABs 712 included in the CPLD 700. For example, a memory array 714-1 included in the EAB 712-1 can be configured to store the Zth computation stage current number CN(Z) much as the data storage buffer unit 506 shown in FIG. 4.

Once the LABs and the EABs included in the CPLD 700 are configured to operate as the logic resources required to form the inventive digital divider circuit, the global horizontal conductors 718 and the global vertical conductors 720 are called upon to appropriately connect each of the appropriately configured LABs and EABs to form the inventive digital divider circuit. For example, with the logic elements 716-1 included in the LAB 710-1 configured to function as a bit selector unit (bit selector unit 502), a global horizontal conductor 718-1 can be used to connect the logic elements 716-1 to the logic elements 716-2 included in the LAB 710-2 configured to operate as a shifter unit (shifter unit 508). The remainder of the digital divider circuit 500 can be formed in a similar manner.

The inventive digital division is implemented by a combination of subtraction, logical OR, and shifting operations. The logical OR operation requires only approximately one gate per bit as compared to approximately 12–15 gates per bit needed in conventional methods of performing digital division. The binary subtraction is only L bits wide at a Zth computation stage where Z equals L. This binary subtraction requires only approximately half the logic as in conventional methods of performing subtraction. Since the subtraction operations constitute the majority of the logic in the inventive method, reducing the subtraction resources by half substantially reduces the size of the digital divider logic.

In the case where the invention is implemented as a CPLD, the CPLD can successfully be applied to many additional uses that were previously infeasible or impractical. For example, several applications in the areas of high speed, high resolution graphics rendering are now economically feasible with the advent of the invention. By providing an efficient method of performing digital division, when implemented in a complex programmable logic device, the invention utilizes fewer logical resources. By using fewer logical resources, the precision and the speed of the digital division as performed by the complex programmable logic device are both increased. Additionally, the probability of successfully implementing the digital division in the complex programmable logic device is commensurably increased.

While this invention has been described in terms of a preferred embodiment, there are alterations, permutations, and equivalents, which fall within the scope of this invention. It should also be noted that there are many alternative ways of implementing the invention. It is therefore intended that the invention be interpreted as including all such alterations, permutations, and equivalents as fall within the true spirit and scope of the present invention.

What is claimed is:

1. A method of digital division to generate a quotient data word from a divider data word and a dividend data word, said divider data word and said dividend data word each include P bits where P is a precision index indicative of a desired precision of said digital division, said method comprising:

(a) subtracting selected divider data word bits from selected current number data bits from a current number data word to form a subtraction result data word and an associated remainder result data word;

(b) generating a logical OR result data word based upon at least said associated remainder result data word by, logically ORing the remaining divider data word bits together to form a partial logical OR result, and logically ORing said partial logical OR result with said remainder result data word to generate said logical OR result;

(c) setting a quotient data word bit of said quotient data word to a predefined value based upon said logical OR result; and (d) generating a new current number data word based on the logical OR result, the subtraction result data word, the current number data word, and the dividend data word.

2. A method of performing digital division as recited in claim 1, wherein said predefined value is a numerical "1" whenever said logical OR result is a logical "0", and a numerical "0" whenever said logical OR result is a logical "1".

3. A method of performing digital division as recited in claim 1, wherein said method further comprises:

(e) initializing, prior to said subtracting (a), a computation stage index Z indicative of an associated computation stage of the digital division to an initial value.

4. A method of performing digital division as recited in claim 3, wherein said method further comprises:

(f) repeating (a)–(d) to set additional quotient data word bits of said quotient data word.

5. A method of performing digital division as recited in claim 3, wherein said method further comprises:

(g) comparing said computation stage index Z with said precision index P;

(h) incrementing said computation stage index Z by a pre-selected incrementing value after setting (c) has been completed; and (i) repeating operation (a)–(d), (f) and (h) until said comparing (g) indicates that said computation stage index Z equals said precision index P.

6. A method of performing digital division as recited in claim 5, wherein said initial value is an arithmetic "1" indicative of a $1^{st}$ computation stage and said incrementing value is an arithmetic "1".

7. A method of performing digital division as recited in claim 3, wherein said partial result logical OR result is a logical zero whenever said computation stage index Z equals said precision index P.

8. A method of performing digital division as recited in claim 1, wherein said method further comprises:
(j) recalculating said current number to form a next stage current number whenever said comparing (g) indicates that said computation stage index Z does not equal said precision index P.

9. A method of performing digital division as recited in claim 8, wherein said recalculating (j) comprises:
whenever said logical OR result is a logical "0",
(k) shifting said subtracted result data word bits in a prescribed direction to form a first result data word;
(l) adding said second result data word to said dividend data word; and
(m) repeating operation (k)–(l) until said comparing (g) indicates that said computation stage index Z equals said precision index P, or
whenever said logical OR result is a logical "1",
(n) shifting in a prescribed direction said current number data word to form a first result data word;
(o) adding said second result data word to a second selected dividend data word; and
(p) repeating operation (n)–(o) until said comparing (g) indicates that said computation stage index Z equals said precision index P.

10. A method of performing digital division as recited in claim 9 wherein said prescribed direction is shifted left by one bit location (Arithmetic Shift Left).

11. A method of performing digital division as recited in claim 9, wherein said second selected dividend data word bit is a bit located in the (MSB−Z)th location of said dividend data word.

12. A method of performing digital division as recited in claim 1 wherein said selected current number data word bit is a least significant bit (LSB) of said current number data word.

13. A division circuit for generating a quotient data word from a divider data word and a dividend data word, the divider data word and the dividend data word each include P bits where P is a precision index indicative of a desired precision of the digital division, comprising:
a first means for performing the function of subtracting selected divider data word bits from selected current number data word bits from a current number data word to form a subtraction result data word and a associated remainder result data word;
a second means connected to said first means for performing the function of generating a logical OR result data word based upon at least said associated remainder result data word by,
logically ORing the remaining divider data word bits together to form a partial logical OR result, and
logically ORing said partial logical OR result with said remainder result data word to generate said logical OR result;

a third means connected to said second means for performing the function of setting a quotient data word bit of said quotient data word to a predefined value based upon said logical OR result; and
a fourth means connected to said third means for performing the function of generating a new current number data word based upon the logical OR result data word, the subtraction result data word, and the current number data word.

14. A digital division circuit as recited in claim 13, wherein said predefined value is a numerical "1" whenever said logical OR result is a logical "0", and a numerical "0" whenever said logical OR result is a logical "1".

15. An integrated circuit capable of generating a quotient data word from a divider data word and a dividend data word, the divider data word and the dividend data word each include P bits where P is a precision index indicative of a desired precision of the digital division, the integrated circuit comprising:
a plurality of input/output lines capable of receiving the divider data word and the dividend data word;
a first means as recited in claim 13 connected to the input/output lines
a second means as recited in claim connected to said first means;
a third means as recited in claim 13 connected to said second means; and
a fourth means as recited in claim 13 connected to said third means and said input/output lines.

16. An integrated circuit as recited in claim 15, wherein said integrated circuit is a programmable logic device.

17. A division circuit for generating a quotient data word from a divider data word and a dividend data word, the divider data word and the dividend data word each include P bits where P is a precision index indicative of a desired precision of the digital division, comprising:
a plurality of input/output lines arranged to receive said dividend data word and said divider data word;
a subtractor connected to said input/output lines for subtracting selected divider data word bits from selected current number data word bits to form a subtraction result data word and an associated remainder result data word;
a logical ORing unit connected to said subtractor for generating a logical OR result data word based upon at least said associated remainder result data word by,
logically ORing the remaining divider data word bits together to form a partial logical OR result, and
logically ORing said partial logical OR result with said remainder result data word to generate said logical OR result;
a bit setter connected to said logical ORing unit for setting a quotient data word bit of said quotient data word to a pre-defined value based upon said logical OR result; and
a selector connected to said logical ORing unit and said input/output lines used to create a new current number data word based upon said subtraction result data word, said current number data word and selected dividend data bits.

* * * * *